United States Patent [19]
Sorbel et al.

[11] Patent Number: 5,709,083
[45] Date of Patent: Jan. 20, 1998

[54] HYDRAULIC SWING MOTOR DECELERATION CONTROL

[75] Inventors: Dennis L. Sorbel, Maple Park; John W. Grant, Pekin, both of Ill.

[73] Assignee: Caterpillar Inc., Peoria, Ill.

[21] Appl. No.: 698,380

[22] Filed: Aug. 15, 1996

[51] Int. Cl.$^6$ ............................................. F16D 31/02
[52] U.S. Cl. ............................ 60/394; 60/436; 60/468
[58] Field of Search ........................... 60/394, 435, 441, 60/442, 468, 469; 91/41, 42, 44

[56] References Cited

U.S. PATENT DOCUMENTS

| | | | |
|---|---|---|---|
| 4,194,365 | 3/1980 | Stoufflet et al. | 60/468 |
| 4,244,276 | 1/1981 | Iwata | 60/436 |
| 4,317,331 | 3/1982 | Aruga et al. | 60/436 |
| 4,481,770 | 11/1984 | Lohbauer et al. | 60/468 |
| 4,495,767 | 1/1985 | Akiyama et al. | 60/436 |
| 4,586,332 | 5/1986 | Schexnayder | 60/468 |
| 4,615,174 | 10/1986 | Nagahara | 60/442 |
| 4,729,222 | 3/1988 | Tanaka et al. | 60/436 |
| 5,419,132 | 5/1995 | Sato et al. | 60/468 |

FOREIGN PATENT DOCUMENTS 139505  10/1980  Japan ........................ 60/436

*Primary Examiner*—F. Daniel Lopez
*Attorney, Agent, or Firm*—John W. Grant; J. W. Burrows

[57] ABSTRACT

A hydraulic deceleration control for a hydraulic motor includes a pilot operated control valve for controlling fluid flow through a pair of motor lines connected to the opposite sides of the hydraulic motor. A valve device is disposed to communicate a source of pressurized fluid to a fluid energy storage device when the control valve is in its open position and to release the pressurized fluid contained in the storage device when the control valve is moved from the open position to its closed position. A throttle orifice releases the fluid from the storage device at a controlled flow rate. A pilot operated diverter valve is disposed in series with an orifice disposed between the motor lines to control fluid flow through the orifice and has a spring disposed at a first end resiliently biasing the diverter valve to its closed position. The storage device is in communication with a second end of the diverter valve when the valve device is releasing the fluid from the storage device so that the diverter valve moves to and is maintained in its open position while fluid is being released from the storage device.

7 Claims, 2 Drawing Sheets

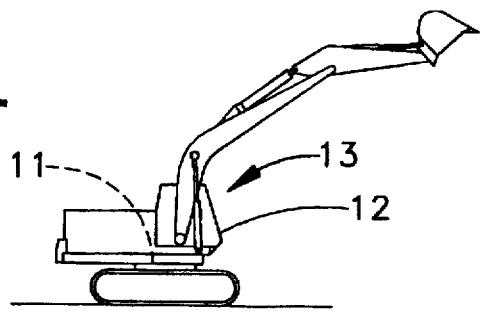
Fig_1_
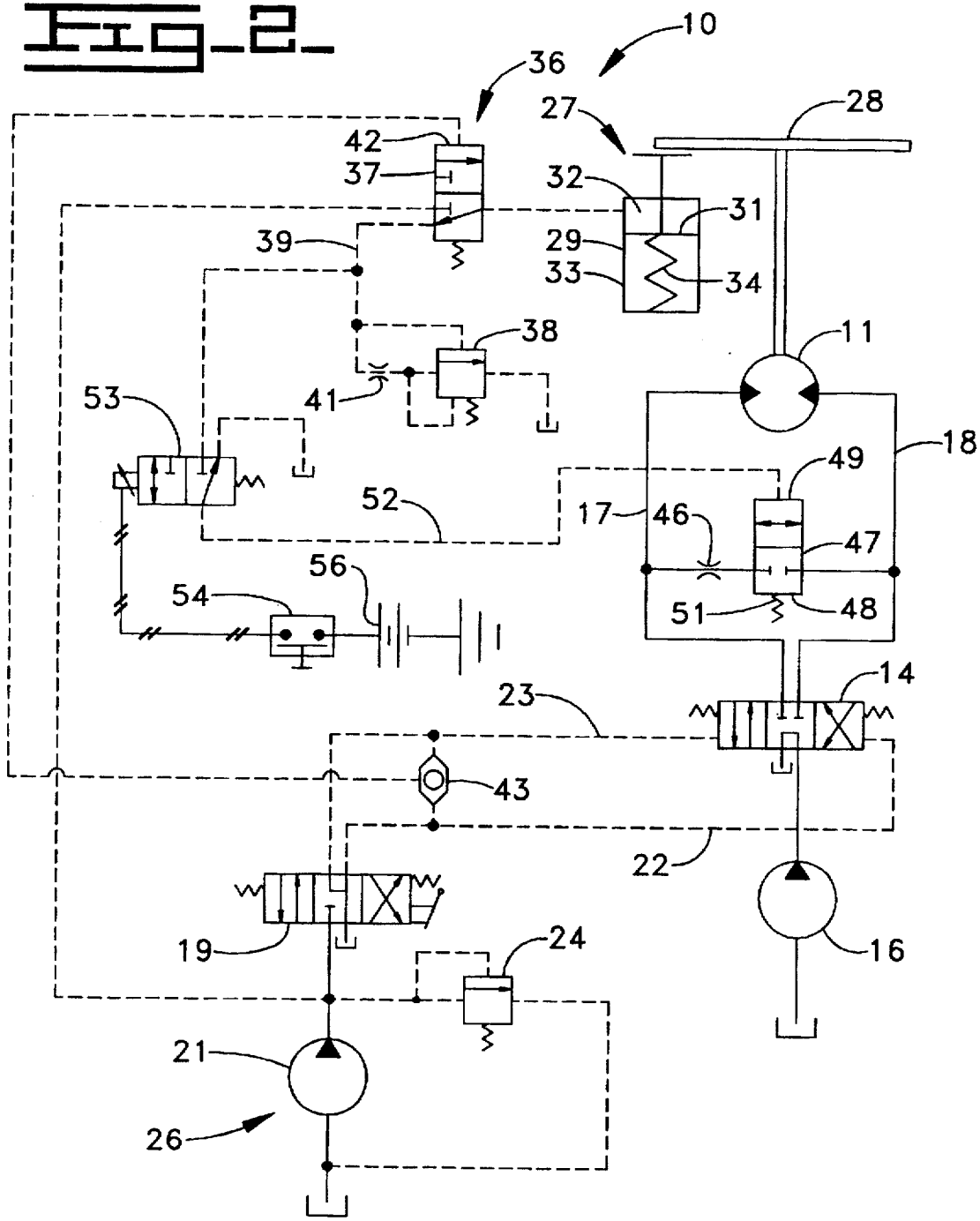
Fig_2_

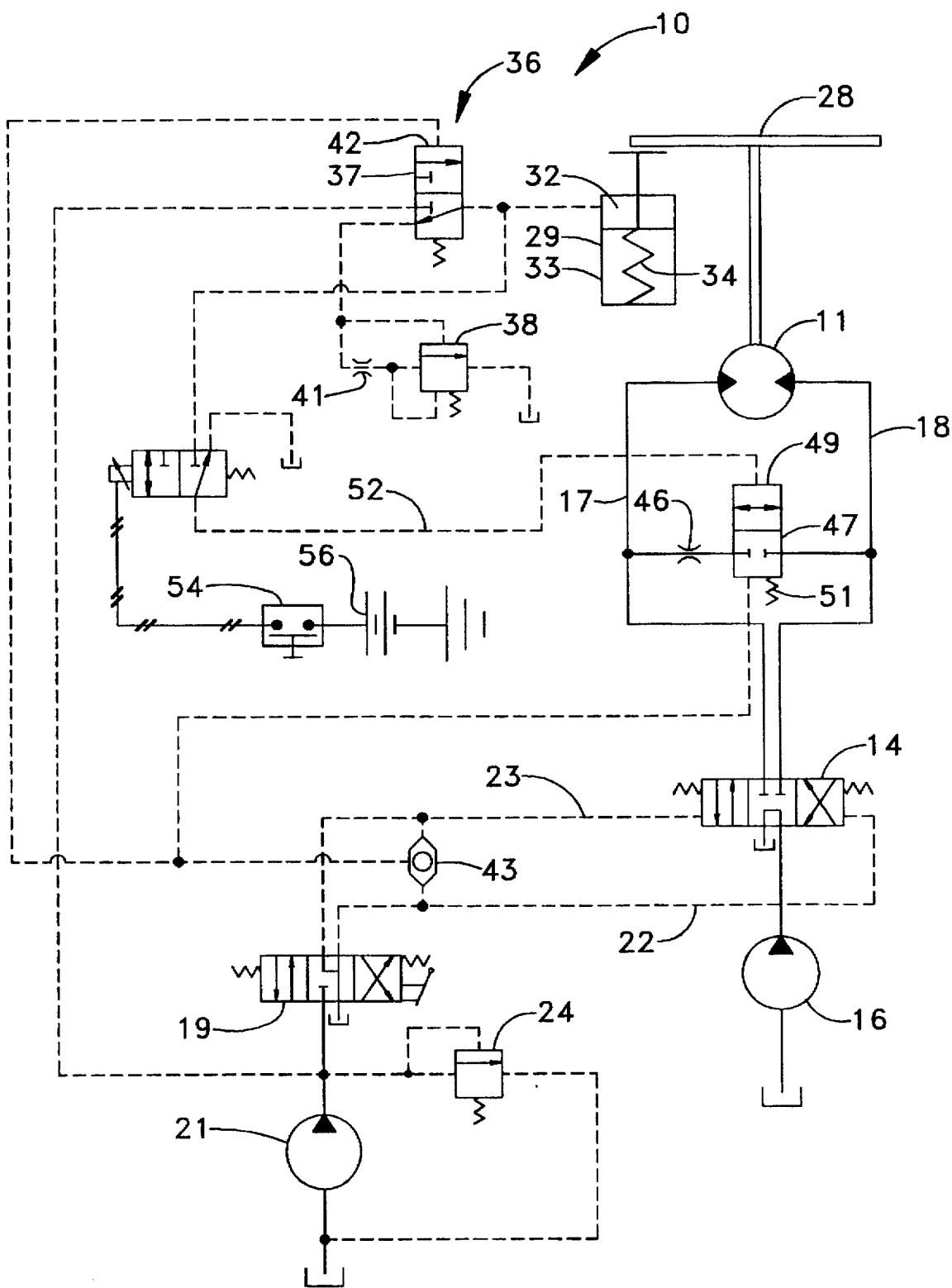
Fig_3

HYDRAULIC SWING MOTOR DECELERATION CONTROL

TECHNICAL FIELD

This invention relates generally to a hydraulic swing motor control for an excavator or the like and, more particularly, to a control providing restricted free swing for deceleration control.

BACKGROUND ART

The rotatable upper structure of many machines, such as excavators and the like, is rotated by a hydraulic swing motor controlled by a directional control valve. Because of the large mass and the geometry of the upper structures, high inertia loads are generated in the upper structure when it is rotated. Such inertia loads must be absorbed by the swing motor and/or hydraulic circuit when the upper structure is brought to a stop.

Many devices have been employed in the hydraulic circuit of such devices to prevent or minimize inertia induced hydraulic shock loads on the various parts of the machine and the hydraulic circuit. One such example is disclosed in U.S. Pat. No. 4,586,332. The control circuit of that patent includes a pair of normally open shunt valves, each of which establishes restricted communication between the motor conduits in a particular direction at their normal spring-biased position to allow limited free swing of the upper structure when the directional control valve is shifted from an operating position to the neutral position. One of the problems encountered therewith is that unless the shunt valves are manually actuated to their flow blocking position, the swing motor would not be hydraulically locked and externally generated loads acting on the upper structure could cause unwanted rotation of the swing motor.

The present invention is directed to overcoming one or more of the problems as set forth above.

DISCLOSURE OF THE INVENTION

In one aspect of the present invention, a hydraulic deceleration control for a hydraulic motor includes a pair of motor lines connected to the opposite sides of the hydraulic motor and a pilot operated control valve connected to the motor lines and having closed and open positions. A valve device is disposed to communicate a source of pressurized fluid to a fluid energy storage device when the control valve is in its open position and to release the pressurized fluid contained in the storage device when the control valve is moved from the open position to the closed position. The valve device includes a throttle orifice to release the fluid from the storage device at a controlled rate. A pilot operated diverter valve is disposed in series with an orifice disposed between the motor lines to control fluid flow through the orifice and has first and second ends and a spring disposed at the first end resiliently biasing the diverter valve to its closed position. The storage device communicates with the second end of the diverter valve when the valve device is releasing the fluid from the storage device.

The problem of having restricted fluid flow between the motor lines when the control valve is moved to the closed position is solved by providing an orifice and a normally closed diverter valve between a pair of motor lines connected to the hydraulic motor. A valve device is operative to move the diverter valve to a position providing restricted flow between the motor lines only for a predetermined time after the control valve is shifted from an open operative position to its closed position. After the predetermined time has lapsed, the diverter valve is returned to its closed position to hydraulically lock the hydraulic motor.

BRIEF DESCRIPTION OF THE DRAWINGS

FIG. 1 is a side elevational view of an excavator embodying the principles of the present invention; and FIGS. 2 and 3 are schematic illustrations of two embodiments of the present invention.

BEST MODE FOR CARRYING OUT THE INVENTION

Referring now to FIGS. 1 and 2, a hydraulic deceleration control 10 for controlling a hydraulic swing motor 11 adapted to drivingly rotate an upper structure 12 of a hydraulic excavator 13 includes a pilot operated control valve 14 connected to a pump 16 and to opposite sides of the hydraulic motor through a pair of motor lines 17,18. A pair of cross line relief valves, not shown, interconnect the motor lines 17,18 in the usual manner so that excessive pressure above a predetermined value in one of the motor lines is relieved to the other of the motor lines.

The control valve 14 is spring biased to the closed position shown and is movable in opposite directions to first and second open positions to direct pressurized fluid through the motor lines for driving the hydraulic motor in the usual manner. A manually actuated pilot control valve 19 is connected to a pump 21 and to the opposite ends of the control valve 14 through a pair of pilot lines 22, 23. A relief valve 24 operates in conjunction with the pilot pump 21 to provide a source 26 of pressurized fluid at a predetermined pressure level.

A spring applied hydraulically released brake 27 is disposed for controllably frictionally braking and/or holding a rotatable element 28 driven by the swing motor 11 and suitably coupled to the upper structure 12. The brake 27 includes an actuator 29 having a piston 31 separating a fluid chamber 32 and a spring chamber 33 containing a spring 34. A pilot operated two position brake valve device 36 is connected to the pilot pump 21 and to the actuator chamber 32 of the actuator 29. The brake valve device 36 includes a spool 37 connected to a relief valve 38 through a passage 39 which has a throttle orifice 41 disposed therein. An end 42 of the valve spool 37 is connected to the output of a resolver 43 connected between the pilot lines 22, 23.

An orifice 46 and a two position pilot operated diverter valve 47 are disposed in series between the motor lines 17,18. The diverter valve 47 has opposite ends 48, 49 and a spring 51 disposed at the end 48 resiliently biasing the diverter valve to its closed flow blocking position shown. The end 49 of the diverter valve is connected to the passage 39 through a control line 52. A two position solenoid operated valve 53 is disposed in the control line 52 for controlling fluid flow therethrough. The solenoid valve 53 is spring biased to the position shown and is actuated to the open position by an electric signal from a manually actuated switch 54 connected to a source of electrical energy 56.

Another embodiment of a hydraulic deceleration control 10 of the present invention is disclosed in FIG. 3. It is noted that the same reference numerals of the first embodiment are used to designate similarly constructed counterpart elements of this embodiment. In this embodiment, however, the control line 52 connects the end 49 of the diverter valve 47 to the fluid chamber 32 of the actuator 29. Also, the end 48 of the diverter valve is connected to the output of the resolver 43.

Industrial Applicability

In the use of the embodiment of FIG. 2, the solenoid valve 53 functions as an on-off valve to control operation of the deceleration control 10. At the spring biased position of the solenoid valve, the end 49 of the diverter valve 47 is vented to the tank to de-activate the deceleration control. The deceleration control is activated by closing the switch 54 to energize the solenoid valve 53 moving it rightward to establish communication through the control line 52.

With the decelartion control activated assume now that the pilot valve 59 has been shifted leftward to direct pilot fluid through the pilot line 22 to shift the control valve 14 leftward to an open position. This communicates the pump 16 with the motor line 17 and communicates the motor line 18 with the tank. The fluid passing through the motor line 17 causes the swing motor 11 to rotate the rotatable element 28 and thus the upper structure 12 in a first direction with the fluid exhausted from the motor being returned to the tank through the control valve. The pilot fluid is also simultaneously communicated through the resolver 43 to the end 42 of the spool 37 of the brake valve 36 moving the spool 37 downward to a brake-off position to communicate the pump 21 with the fluid chamber 32 of the brake actuator 29. The fluid entering the fluid chamber 32 moves the piston 31 downwardly to release the rotatable element 28. The downward movement of the piston 31 compresses the spring 34 with the fluid pressure in the chamber 32 eventually reaching the pressure setting of the relief valve 24. Once filled with pressurized fluid the actuator 29 becomes an effective fluid energy storage device providing a fixed volume supply of pressurized for a hereinafter described function.

When the operator wishes to stop rotation of the upper structure 12, the pilot valve 19 is returned to the neutral position shown. This simultaneously allows the control valve 14 to return to its closed position and the brake valve 36 to return to its brake-on position. Moving the control valve 14 to its closed position blocks communication therethrough. The inertia of the upper structure acting on the swing motor 11 now causes the swing motor to act as a pump which tends to pressurize the fluid in the conduit 18. However, moving the brake valve 36 to its brake-on position communicates the pressurized fluid momentarily trapped in the fluid chamber 32 with the passage 39 and the control line 52 causing the diverter valve 47 to move to its open position. The inertia generated pressurized fluid in the motor line 18 passes through the diverter valve and the orifice 46 to the motor line 17 and is recirculated through the motor. The orifice 46 restricts fluid flow therethrough to cause a controlled deceleration of the upper structure. In the meantime, the relief valve 38 has also opened allowing the pressurized fluid to released from the chamber 32 to the tank through the throttle orifice 41. The throttle orifice 41 controls the flow rate of the fluid released from the fluid chamber 32 by the spring 33 to delay engagement of the brake and maintain the diverter valve 47 in its open position for a predetermined time. Once the brake 27 becomes engaged to mechanically lock the upper structure at a fixed location, the fluid pressure generated in the fluid chamber 32 by the action of the spring 34 quickly drops below a level sufficient to maintain the diverter valve in its open position thereby allowing the spring 51 to move the diverter valve to its closed position to hydraulically lock the swing motor.

The embodiment of FIG. 3 operates essentially as described above with the exception that movement of the brake valve 36 to the brake-off position communicates the fluid chamber 32 with the end 49 of the diverter valve 47. Dependent upon the actuated position of the pilot valve 19, the pressure directed to the end 48, when combined with the force of the spring 51, may or may not be sufficient to maintain the diverter valve in its closed position. For example, when the pilot valve 19 is only partially actuated for slow rotation of the upper structure, the fluid pressure at the end 48 of the diverter valve 47 would not be sufficient to prevent movement of the diverter valve to its open position. However, if the pilot valve 19 is shifted a maximum opening position for maximum rotational speed of the upper structure, the fluid pressure at the end 48 combined with the spring force would be sufficient to maintain the diverter valve in its closed position.

In the first example, the diverter valve 47 would already be in the open position when the operator moves the pilot valve to its closed position for stopping rotation of the upper structure and would remain in the open position until the brake becomes engaged and the fluid pressure in the fluid chamber 32 and thus the control line 52 drops below the predetermined threshold needed to maintain the diverter valve in the open position. In the second example, moving the pilot valve 19 to its closed position for stopping rotation of the upper structure vents the end 48 of the diverter valve simultaneously with the control valve 14 returning to its closed position and the brake valve returning to its brake-on position. The diverter valve 47 is thus moved to its open position to permit the fluid exhausted from the motor to recirculate through the motor until the brake reaches its engaged position as described above.

Other aspects, objects and advantages of this invention can be obtained from a study of the drawings, the disclosure and the appended claims.

We claim:

1. A hydraulic deceleration control for a hydraulic motor having a pair of motor lines connected to the opposite sides of the hydraulic motor and a pilot operated control valve connected to the motor lines and having closed and open positions comprising:

a source of pressurized fluid;

a fluid energy storage device including a fluid chamber;

a valve device disposed to communicate the source of pressurized fluid to the (storage device) fluid chamber when the control valve is in its open position and to release the pressurized fluid contained in the (storage device) fluid chamber when the control valve is moved from the open position to the closed position, the valve device including a throttle orifice to release the fluid from the (storage device) fluid chamber at a controlled rate;

an orifice disposed between the motor lines; and a pilot operated diverter valve disposed in series with the orifice to control fluid flow through the orifice and having first and second ends and a spring disposed at the first end resiliently biasing the diverter valve to its closed position, the (storage device) fluid chamber being in communication with the second end of the diverter valve when the valve device is releasing the fluid from the (storage device) fluid chamber.

2. The deceleration control of claim 1 wherein the valve device includes a spool and a passage between the spool and the throttle orifice with the passage being selectively connected to the second end of the diverter valve.

3. The deceleration control of claim 2 including a spring applied hydraulically released brake disposed to frictionally stop rotation of the hydraulic motor wherein the energy storage device includes an actuator of the brake.

4. The deceleration control of claim 3 including a pilot valve having an open position and disposed to communicate pilot fluid to an end of the control valve and an end of the spool of the valve device at its open position.

5. The deceleration control of claim 3 including an on-off valve disposed between the passage and the second end of the diverter valve.

6. The deceleration control of claim 1 including a spring applied hydraulically released brake disposed to frictionally stop rotation of the hydraulic motor and including an actuator having the fluid chamber and a spring chamber, the valve device being connected to the fluid chamber and has a brake off position communicating the source of pressurized fluid to the fluid chamber and a brake-on position releasing pressurized fluid contained in the fluid chamber.

7. The deceleration control of claim 6 including a pilot valve having an open position and disposed to communicate pilot fluid to an end of the control valve, the valve device and the first end of the diverter valve at its open position.

* * * * *

UNITED STATES PATENT AND TRADEMARK OFFICE
CERTIFICATE OF CORRECTION

PATENT NO. : 5,709,083

DATED : January 20, 1998

INVENTOR(S) : Dennis L. Sorbel, et al.

It is certified that error appears in the above-identified patent and that said Letters Patent is hereby corrected as shown below:

Please correct Claim 1 to read as follows:

A hydraulic deceleration control for a hydraulic motor having a pair of motor lines connected to the opposite sides of the hydraulic motor and a pilot operated control valve connected to the motor lines and having closed and open positions comprising:

a source of pressurized fluid;

a fluid energy storage device including a fluid chamber;

a valve device disposed to communicate the source of pressurized fluid to the fluid chamber when the control valve is in its open position and to release the pressurized fluid contained in the fluid chamber when the control valve is moved from the open position to the closed position, the valve device including a throttle orifice to release the fluid from the fluid chamber at a controlled rate;

UNITED STATES PATENT AND TRADEMARK OFFICE
CERTIFICATE OF CORRECTION

PATENT NO. : 5,709,083
DATED : January 20, 1998
INVENTOR(S) : Dennis L. Sorbel, et. al.

It is certified that error appears in the above-identified patent and that said Letters Patent is hereby corrected as shown below:

an orifice disposed between the motor lines; and a pilot operated diverter valve disposed in series with the orifice to control fluid flow through the orifice and having first and second ends and a spring disposed at the first end resiliently biasing the diverter valve to its closed position, the fluid chamber being in communication with the second end of the diverter valve when the valve device is releasing the fluid from the fluid chamber.

Signed and Sealed this

Twenty-first Day of September, 1999

Attest:

Q. TODD DICKINSON

*Attesting Officer*  *Acting Commissioner of Patents and Trademarks*